US011824858B1

United States Patent
McKinless et al.

(10) Patent No.: US 11,824,858 B1
(45) Date of Patent: Nov. 21, 2023

(54) SELECTIVE AND GRANULAR MULTI-CUSTOMER SUPPORT ACCESS

(71) Applicant: Rapid7, Inc., Boston, MA (US)

(72) Inventors: Mark McKinless, Belfast (GB); Ryan Edwards, Belfast (GB); Jun Qian, Belfast (GB); Ceara McCurdy, Belfast (GB); Christopher Dowey, Carrickfergus (GB); Ralph McTeggart, Belfast (GB); Ashwin Anand, Acton, MA (US)

(73) Assignee: Rapid7, Inc., Boston, MA (US)

( * ) Notice: Subject to any disclaimer, the term of this patent is extended or adjusted under 35 U.S.C. 154(b) by 416 days.

(21) Appl. No.: 16/924,475

(22) Filed: Jul. 9, 2020

(51) Int. Cl.
H04L 9/40 (2022.01)
G06F 21/57 (2013.01)
G06N 20/00 (2019.01)

(52) U.S. Cl.
CPC ............ H04L 63/10 (2013.01); G06F 21/577 (2013.01); H04L 63/20 (2013.01); *G06F 2221/033* (2013.01); *G06N 20/00* (2019.01)

(58) Field of Classification Search
CPC ....... H04L 63/10; H04L 63/20; G06F 21/577; G06F 2221/033; G06N 20/00
See application file for complete search history.

(56) References Cited

U.S. PATENT DOCUMENTS

| 2012/0109795 | A1* | 5/2012 | Sutherland | G06Q 10/06 705/32 |
| 2015/0082399 | A1* | 3/2015 | Wu | H04L 9/0897 726/10 |
| 2018/0082057 | A1* | 3/2018 | LeMay | G06F 21/54 |
| 2020/0412765 | A1* | 12/2020 | Krishnamurthi | H04L 63/108 |
| 2021/0092124 | A1* | 3/2021 | Albero | H04L 63/20 |

* cited by examiner

Primary Examiner — Michael R Vaughan
(74) Attorney, Agent, or Firm — Ashwin Anand

(57) ABSTRACT

Disclosed herein are methods, systems, and processes to configure and facilitate selective and granular multi-customer support access in cloud-based cybersecurity computing environments. A request to authorize a multi-customer support account (MCSA) is received. Customer accounts that include an anchor tenant customer account and several secondary tenant customer accounts as well as a set of applications associated with the customer accounts are identified. The MCSA is configured to selectively access customer accounts and granularly access associated applications by being designated with a set of varying access limits for the anchor tenant customer account and another set of varying access limits for the secondary tenant customer accounts, each set of varying access limits being made applicable to various instances of applications associated with each of those customer accounts. The designation further restricts a subsequently modifiable access time of the MCSA at least at a client-level, an application level, and a feature-level. The request to authorize the MCSA is then approved.

3 Claims, 8 Drawing Sheets

Multi-Customer Support Account (MCSA) Authorization Table 405

| Customer Account Field 410 | Security Policy Field 415 | First Duration Field (t1) 420 | Permitted Applications Field 425 | Second Duration Field (t2) 430 | Permitted Operations Field 435 | Third Duration Field (t3) 440 | Shared & Complementary Operations Field 445 | Access adjust? Field 450 |
|---|---|---|---|---|---|---|---|---|
| Client 150(1) | Primary Security Policy 225 | 10 minutes (total) | 155(1) 160 165(1) | 4 minutes 3 minutes 3 minutes | 215(1)-(5) None 215(3)-(8) | 2 minutes 0 1 minute | 215(3),(4),(5) + 155(1), 165(1) | Yes (avg. only) |
| Client 150(2) | Secondary Security Policy 235(1) | 20 minutes (total) | 155(2) 165(1) 170(1) | 10 minutes 4 minutes 6 minutes | 215(1)-(2) 215(1) 215(4)-(7) | 5 minutes 3 minutes 4 minutes | 215(1) + 155(2), 170(1) | Yes (t3 only) |
| Client 150(3) | Secondary Security Policy 235(2) | 24 hours (total) | 155(1) 160 170(1) | 15 hours 5 hours 4 hours | 215(1)-(5) 215(5)-(10) 215(5)-(15) | 5 hours 5 hours 14 hours | 215(5),(5)-(10) + 155(1), 160, 170(1) | Yes (t2 and t3) |
| ... | ... | ... | ... | ... | ... | ... | ... | ... |

*FIG. 4*

SELECTIVE AND GRANULAR MULTI-CUSTOMER SUPPORT ACCESS

BACKGROUND

Field of the Disclosure

This disclosure is related is to controlling reverse access to computing systems and applications in cybersecurity computing environments. In particular, this disclosure is related to providing selective and granular multi-customer support access.

Description of the Related Art

Managed detection and response (MDR) is an outsourced service that provides organizations with threat hunting services and responds to threats once they are discovered from a security operations center (SOC). Security engineers and analysts not only provide MDR customers access to their pool of researchers and engineers, but also permit MDR customers to avail themselves of a family of various security software and products that can be used for monitoring networks, analyzing incidents, and responding to security cases.

MDR providers typically support thousands of customers with a range of cloud-based security software products. Given that a typical SOC only includes a handful of security engineers supporting a large number of customers, it is imperative that single sign-on access is provided that permits a security engineer to access multiple customer devices and/or machines and multiple software products within that devices and/or machines.

Unfortunately, given the operational, logistical, and security-related concerns in cybersecurity computing environments, existing single sign-on access mechanisms are unscalable, ineffective, and insecure. Moreover, existing single sign-on mechanisms for MDR do not permit the secure provisioning of selective and granular multi-customer support access.

SUMMARY OF THE DISCLOSURE

Disclosed herein are methods, systems, and processes to configure and provision secure and granular multi-customer support access. One such method involves receiving a request to authorize a multi-customer support account, accessing a dataset identifying customer accounts that include an anchor tenant customer account and secondary tenant customer accounts associated, and a set of applications associated with the customer accounts. The method involves configuring the multi-support customer account to selectively access customer accounts identified in the dataset by designating the anchor tenant customer account with a first set of varying access limits applicable to application instances in the set of applications and designating secondary tenant customer accounts with a second set of varying access limits applicable to other instances in the set of applications. The method then involves approving the request to authorize the multi-customer support account.

In one embodiment, as part of the configuring, the method involves correlating the multi-customer support account to a forward-facing account associated with the customer accounts. The method then involves determining the first set of varying access limits and the second set of varying access limits based on the correlating indicating whether a security policy associated with a forward-facing account of the anchor tenant customer account is more restrictive or less restrictive than one or more other security policies associated with other forward-facing accounts of the secondary tenant customer accounts, and based on the correlating indicating that the security policy is more restrictive, adjusting the second set of varying access limits to be equal to or less than the first set of varying access limits.

In another embodiment, the first set of varying access limits curtail access to instance(s) of the application(s) based on a varied set of access expiration time durations applicable to each of the instances, and the second set of varying access limits curtail access to the one or more other instances of the one or more applications based on another varied set of access expiration time durations applicable to each of the one or more other instances.

In some embodiments, the method involves conditionally rendering a first set of features of instances of the applications based on a first authentication information for the anchor tenant customer account and a second set of features of other instances of the applications based on a second authentication information for a secondary tenant customer account of the one or more secondary tenant customer accounts. In other embodiments, the method involves restricting access by the multi-customer support account to certain features of the first set of features based on the first authentication information and the first set of varying access limits and to certain other features of the second set of features based on the second authentication information and the second set of varying access limits.

In one embodiment, the method involves determining that an instance of a vulnerability management application has identified one or more security vulnerabilities, determining that another instance of a penetration testing application is required to validate the one or more security vulnerabilities identified by the instance of the vulnerability management application, and modifying a second varying access limit of the second set of varying access limits based on a time required to validate the one or more security vulnerabilities by the another instance of the penetration testing application.

In other embodiments, the method involves accessing one or more instances of one or more applications in a single user interface using the multi-customer support account and the set of applications include a vulnerability risk management (VRM) application, an incident detection and response (IDR) application, a dynamic application security testing (DAST) application, a penetration testing application, a security orchestration and automation (SOAR) application, or a cloud security posture management (CSPM) application, that can be communicatively coupled to each other and implemented on a cloud platform.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

FIG. 4 is a table 400 of a MCSA authorization table, according to one embodiment of the present disclosure.

Figure 1:
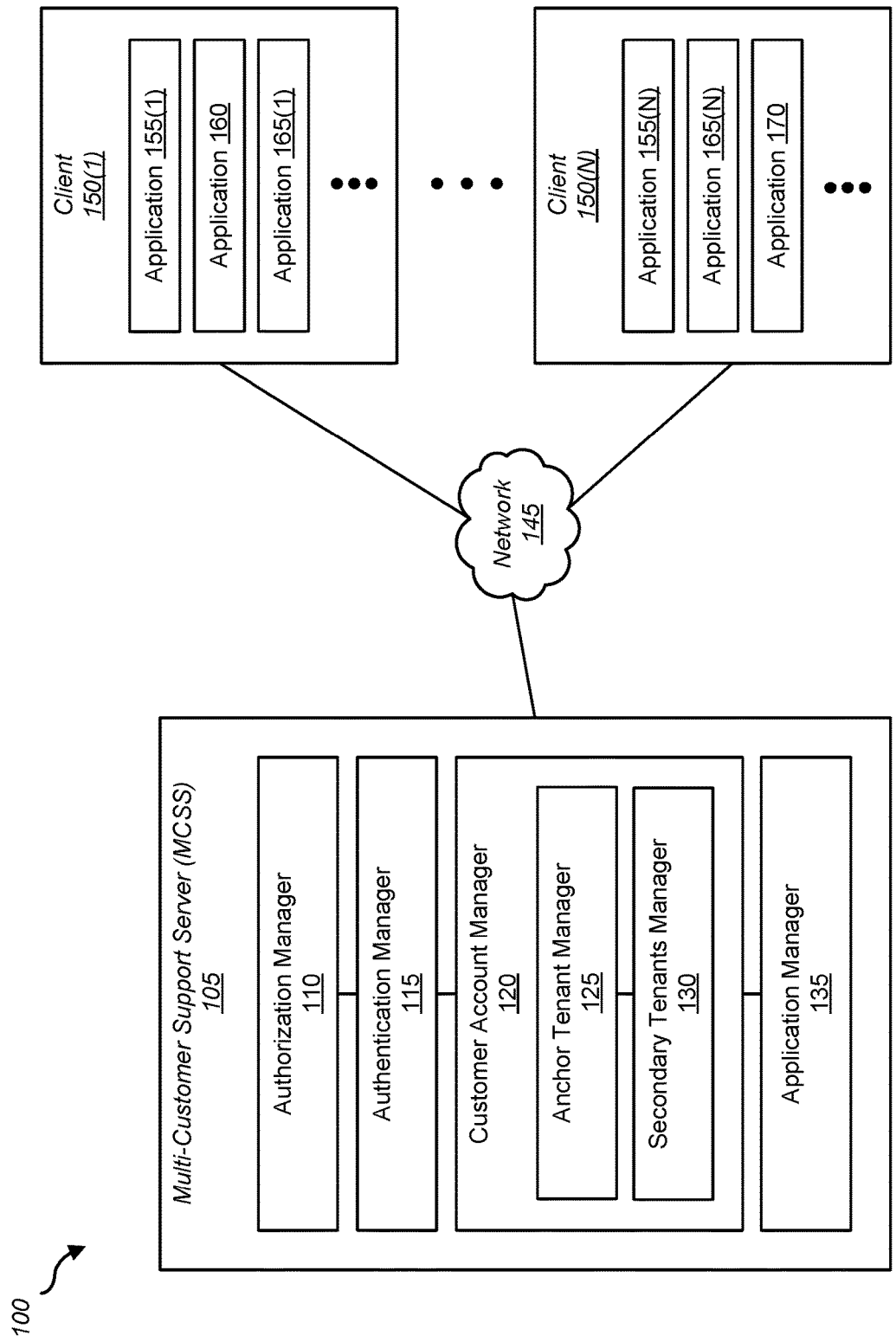
FIG. 1 is a block diagram 100 of a multi-customer support server (MCSS), according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

In modern cybersecurity computing environments, cybersecurity product, software, and service providers, vendors, and companies routinely offer specialized technical support to thousands of customers who use and implement a wide range of cloud-based and on-premise-based cybersecurity products. A cybersecurity company offering technical support to its customers can be expected to provide remote-based technical support either on an on-demand basis or an on-going basis. For example, cybersecurity software and service providers such as Rapid7® of Boston, Mass., offer a product-based and human-based service called Managed Detection and Response (MDR) to their customers.

MDR involves using one or more cybersecurity software products as part of a diverse security toolbox to enable a security engineer or a security analyst in a Security Operations Center (SOC) to remotely configure, implement, provision, troubleshoot, and provide cybersecurity services and perform cybersecurity computing operations (e.g., in real-time) that can include vulnerability risk management (VRM), incident detection and response (IDR, as part of a Security Information and Event Management (SIEM) implementation), penetration testing (e.g., offensive security operations), application testing (e.g., using Dynamic Application Security Testing (DAST) software), and/or network traffic analysis for network security (e.g., using an Enterprise Network Traffic Analysis (ENTA) tool). In addition, a MDR cybersecurity computing environment can also include a Security Orchestration and Automation (SOAR) tool to orchestrate (e.g., setup and configure) and automate one or more of the security operations noted (e.g., complementary security operations such as vulnerability assessment and vulnerability validation, incident detection and remediation (e.g., using third-party software), among others).

On the client-side (e.g., customer side), each customer maintains their own private access credentials to gain access to their accounts and security products. This single credential provides the customer with access to one or more security products that the customer has purchased or has subscribed to (e.g., VRM software and a SIEM, and the like). If the customer requires technical support or assistance, a technical support engineer will typically require access credentials that are unique to the given customer's account and to the corresponding suite of security products owned by (or subscribed to by) the customer. In current cybersecurity technical support implementations, the foregoing process must be repeated for each customer that requests technical support assistance and the access credentials for the security engineer (or technical support personnel) to each customer's account and security products must be unique and separate from other access credentials for other customers and their corresponding products. Thus, if a cybersecurity company has to provide technical support to thousands of customers, a security engineer (e.g., in a SOC) must painstakingly maintain thousands of unique access credentials.

Unfortunately, the current state of technical support implementations do not scale (e.g., when a company with a small security team has to support thousands of customers, each with a unique combination of security products). In addition to the plethora of issues current implementations present with respect to efficiency (or lack thereof), redundancy, and waste of expensive computing and human resources, critical security concerns are also manifested. For example, a security engineer may be required to map and maintain at least dozens of unique access credentials to customer accounts and security products at any given time. Furthermore, a given access credential to a customer account may have to be temporary (e.g., based on a customer's request or security protocols). In this scenario, security engineers are expected to keep track of their permitted access time and delete their own access credentials at the end of an expiry period (e.g., indicated by the customer). The foregoing presents another layer of technical complexity and increases the risk that the support engineer will not terminate access to the customer account as required at the end of the expiry period.

What's more, existing technical support implementations in cybersecurity and MDR computing environments do not take into account and are agnostic to the shared, complementary, related, and/or potentially interoperable nature of cybersecurity software computing operations. Cybersecurity computing operations and security scenarios do not exist (and are not performed) in isolation. Therefore, software products and computing operations in an efficient technical support environment for cybersecurity cannot be treated in a piecemeal fashion. For example, a VRM operation that identifies vulnerabilities can benefit from a penetration testing operation that can offensively validate the discovered vulnerabilities. Similarly, a STEM that detects a potentially malicious incident can benefit from a DAST tool that can quickly scan applications or an ENTA product that can scan network traffic associated with the detected incident.

Therefore, at least in an MDR scenario with complementary cloud-based security products, computing operations performed in such MDR cloud-based environments are mutually related to each other (even if they don't necessarily interoperate without further (manual) configuration). Unfortunately, useful learnings from such mutually related operations that can improve efficiency and security and minimize resource usage (e.g., which cybersecurity operations are correlated (e.g., complementary operations), how much time it takes or should take (e.g., on average) to perform a series of related or frequently-related cybersecurity operations (e.g., by a security engineer), whether the time period of support access is unreasonably small or more than necessary to perform certain operational tasks, and the like) are entirely lost in modern technical support implementations in cybersecurity and MDR computing environments, particularly, with respect to provisioning selective and granular multi-customer support access.

Example Multi-Customer Support Server (MCSS)

FIG. 1 is a block diagram 100 of a multi-customer support server (MCSS), according to one embodiment. MCSS 105, which can include any type of computing device, includes at least an authorization manager 110, an authentication manager 115, a customer account manager 120, and an application manager 135. Customer account manager 120 further includes at least an anchor tenant manager 125 and a secondary tenants manager 130. MCSS is communicatively coupled to clients 150(1)-(N) via a network 145, which can be any type of network or interconnection. Client 150(1) includes at least applications 155(1), 160, and 165(1), and client 150(N) includes at least applications 155(N), 165(N), and 170.

Clients 150(1)-(N) (e.g., customer computing devices) can include and execute one or more applications (or application instances) that are similar, as well as other applications that are different. For example, clients 150(1) and 150(N) both include and execute applications 165(1) and 165(N)—which can be a VRM application (e.g., different instances or copies of the same VRM application supported by MCSS 105). However, clients 150(1) and 150(N) (e.g., different customers) can also include and execute applications that are different. For example, for client 150(1), application 155(1) and be a SIEM and application 160 can be a penetration testing application, while, for client 150(N), application 155(N) can be a DAST application and application 170 can be a SOAR application (or an ENTA application).

In one embodiment, MCSS 105 creates, configures, and authorizes a multi-customer support account (MCSA) that grants access to more than one customer account using the same access credential(s) (e.g., upon authorization performed by authorization manager 110 and authentication performed by authentication manager 115). In addition, the systems, methods, and processes described and disclosed herein permit security engineers to maintain a single MCSA, which in turn, controls access to a varying number of customer accounts, and further controls access to one or more applications (including application functionality of the one or more applications associated with one or more of these customer accounts) based on varying levels of selectivity, granularity, and time periods (e.g., based on several stages of expiry times that can be made applicable to the customer, applications of the customer, certain operations within applications, combination of shared or complementary applications or application operations, and the like). In this example, the MSCA can also be updated in realtime based on a machine trained model that is trained to learn relationships between various other customer accounts and their interactions with various customers and their corresponding applications.

In some embodiments, MCSS 105 requests access to a specific customer account (e.g., client 150(1)) and its applications (e.g., application 160) using the MCSA generated by customer account manager 120. The request identifies the customer's account, one or more security policy requirements that correspond to the given customer account, the duration of access to the customer account (e.g., a first varying access limit, illustrated as t1 in FIG. 2A), one or more applications that require access (including whether any applications are complementary). Complementary applications are applications that are typically used in succession or consecutively during a complex cybersecurity operation because an application operation in each application is required to be performed in succession to complete the cybersecurity operation, or the applications share one or more application-related operations.

For example, in certain embodiments, if client 150(1) performs a vulnerability assessment operation using a VRM application followed by a vulnerability validation operation using a penetration test tool (e.g., such as Metasploit® provided by Rapid7® of Boston, Mass.) the MCSA can be updated in realtime to adjust the time expiration duration to match the average time required (e.g., by one or more security engineers) to perform one or more shared or separate operations using the complementary application.

In some embodiments, the time permitted for application access in the MCSA as well as time permitted for each pre-determined application operation (e.g., log data access, process information access, kernel access, file system search, data retrieval from an on-premise agent, and the like) can be received as part of the request to authorize the MCSA. However, from this starting point, the MSCA can be updated on the fly based on changes to application access time and application operation access time evidenced by at least: (a) whether there are one or more operations that applications can share, called shared applications, (b) whether one or more applications are complementary and are typically used in succession and/or as part of the same overall "support" request, (c) whether secondary tenant manager 130 indicates that the time permitted for application access time and/or application operation access time is not enough or is excessive (e.g., based on other MCSA accounts used by other support and/or security engineers), and (d) direct input from the security engineer (e.g., based on a previous support request that indicates that a subsequent request requires more time or less time).

Therefore, the MCSS 105 facilitates the provisioning of a single access credential that can be modified and updated (e.g., based on user input, input data that can be used to train a machine learning model, and the like) in realtime and on the fly to optimize multi-customer technical support in cybersecurity computing environments. Because the time duration for access can be adjusted and modified based on several crucial and realtime factors that are unique to security engineers in their given operational environments (e.g., average time to "solve" a support ticket, support complexity, resources available to solve the "support problem" and the like), MCSS 105 creates and authorizes a single access credential that is secure because its access can be adjusted and limited (or even expanded, if necessary) in real time based on current factors, application operations, application behavior, and the like.

For example, a customer need not provide an arbitrary "time expiration" requirement for the single MCSA, as is the case in current implementations. The MCSA is only permitted access to sensitive and confidential customer machines and devices only for as long as it takes to provide efficient technical support—a "support access" time period that keeps shifting towards an optimal window (e.g., based on machine learning concepts). It will be appreciated that the customer can minimize un-necessary or un-needed access to sensitive applications and application operations, thus adding an additional layer of security to multi-customer support access.

Example of Building Varied Security Level Authorization into a Single MCSA

Figure 2A:
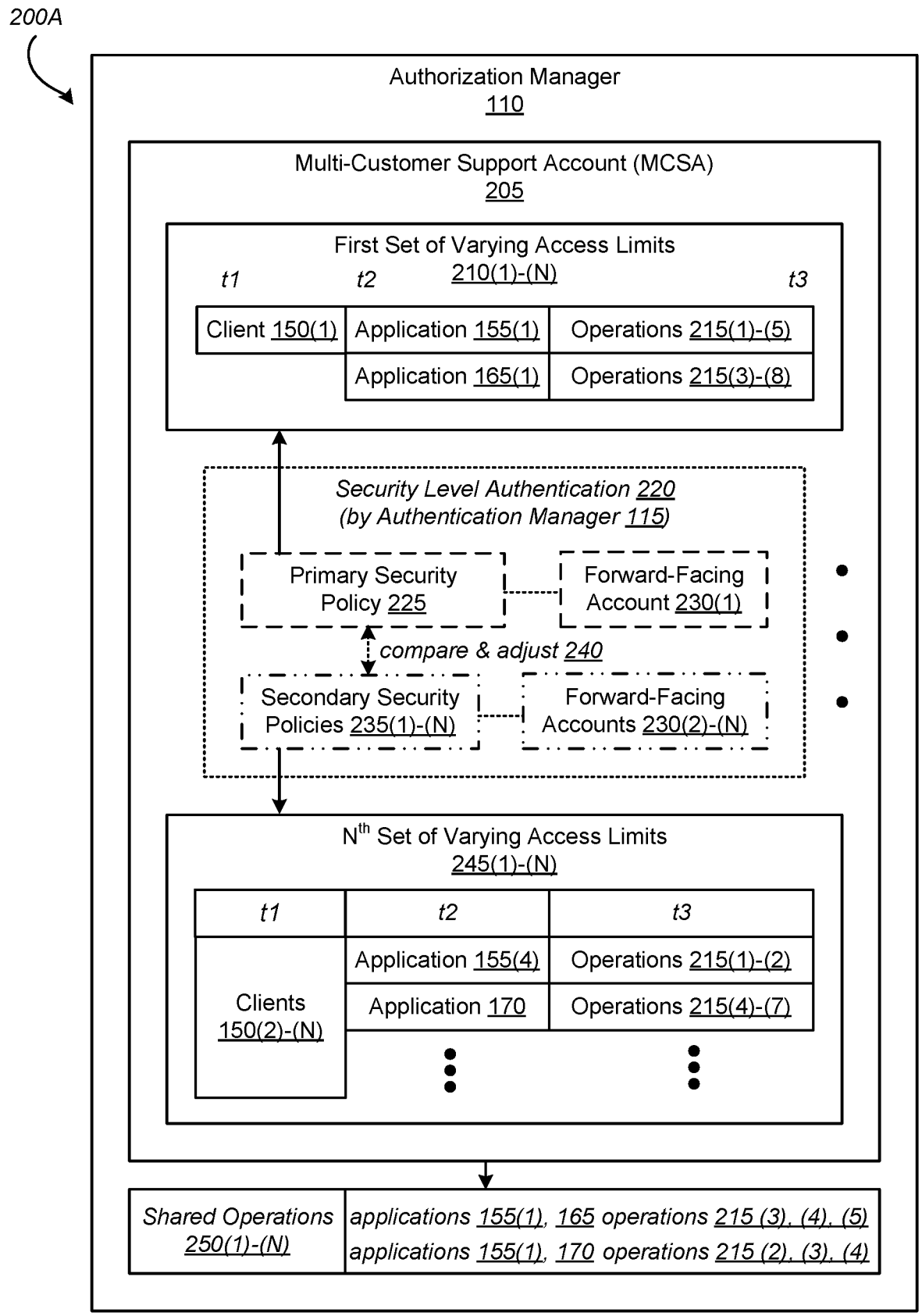
FIG. 2A is a block diagram 200A of an authorization manager, according to one embodiment of the present disclosure.

FIG. 2A is a block diagram 200A of an authorization manager, according to one embodiment. Authorization manager 110 receives a request to authorize a multi-customer support account (MCSA) 205 (e.g., from customer account manager 120). Authorization manager 110 accesses a dataset that identifies one or more customer accounts that include an anchor tenant customer account (e.g., managed by anchor tenant manager 125) and one or more secondary tenant customer accounts (e.g., managed by secondary tenants manager 130) as well as a set of applications associated with the one or more customer accounts (e.g., managed by applications manager 135). In this example, the anchor tenant customer account is the (single) primary (or parent) customer account assigned to a security engineer who performs multi-customer support. Secondary tenant customer accounts are secondary (or child) customer accounts that can be managed by the same security engineer or other security engineers whose multi-customer support accounts are also authorized and managed by MCSS 105. In some embodiments, a secondary tenant customer account can be an anchor tenant customer account for another security engineer other than the security engineer for whom MCSA 205 is authorized.

In certain embodiments, prior to approving MCSA 205, authorization manager 110 configures MCSA 205 to selectively access customer accounts identified in the dataset by: (a) designating the anchor tenant customer account with a first set of varying access limits 210(1)-(N) applicable to one or more instances of one or more applications (e.g., client 150(1) with application 155(1) with operations 215(1)-(5) and application 165(1) with operations 215(3)-(8) where operations 215(3), 215(4), and 215(5) are "shared" operations), and (b) designating one or more secondary tenant customer accounts with a second set of varying access limits applicable to one or more other instances of the one or more applications (e.g., Nth set of varying access limits 245(1)-(N) with application 155(4) with operations 215(1)-(2) and application 170 with operations 215(4)-(7), where there are no shared operations). MCSA 205 is then authorized. In this example, the (single) anchor tenant customer account and (multiple) secondary tenant customer accounts are designated with varying access limits (e.g., access expiration durations) by authorization manager 110 at (at least) three access locations or points: client-level, application-level, and (application) operation-level (indicated as t1, t2, and t3 in both first set of varying access limits 210(1)-(N) and Nth set of varying access limits 245(1)-(N) in FIG. 2A).

Because MCSA 205 is a backward-facing account (e.g., support engineer to client), MCSA 205 has to be correlated to a forward-facing account (e.g., client to MCSS 105 or to a suite of security products hosted on the Cloud) associated with one or more of clients 150(1)-(N) so that adjustments and modifications can be made to varying access limits of secondary tenant customer accounts in MCSA 205 on the fly based on security policies of customers can be more or less restrictive than existing security policies, differences in security policies of other customers managed by the same MCSA 205, security policies that can change to become more restrictive than a previous security policy of an anchor tenant customer account, and the like.

Therefore, as part of the configuring discussed above, security level authentication 220 is performed by authentication manager 115 to correlate MCSA 205 to a forward-facing account 230(1) associated with each customer account. In certain embodiments, determining the first set of varying access limits 210(1)-(N) and the Nth set of varying access limits 245(1)-(N) is based on the correlating indicating whether a security policy associated with a forward-facing account (e.g., primary security policy 225 of forward-facing account 230(1) as shown in FIG. 2A) of the anchor tenant customer account is more restrictive or less restrictive than one or more other security policies associated with one or more other forward-facing accounts (e.g., secondary security policies 235(1)-(N) of forward-facing accounts 230(2)-(N)) of one or more secondary tenant customer accounts. In this example, based on the correlating indicating that the security policy is more restrictive, authorization manager 110 adjusts second set of varying access limits (e.g., Nth set of varying access limits 245(1)-(N)) to be equal to or less than the first set of varying access limits (e.g., 210(1)-(N)).

In some embodiments, first set of varying access limits 210(1)-(N) curtails access to one or more instances of one or more applications based on a varied set of access expiration time durations applicable to each of the or more instances or to the various points of client, application, and operational access (e.g., t1, t2, and t3 in first set of varying access limits 210(1)-(N)) and Nth set of varying access points 245(1)-(N) curtails access to one or more other instances the one or more applications based on another varied set of access expiration time durations applicable to each of the one or more other instances or the various points of client, application, and operation access (of those other instances). As shown in FIGS. 2, t1, t2, and t3 in first set of varying access limits 210(1)-(N)) is different than t1, t2, and t3 in Nth set of varying access limits 240(1)-(N)).

In other embodiments, security level authentication 220 performed by authentication manager 115 involves conditionally rendering a first set of features of one or more instances of the applications based on first authentication information for the anchor tenant customer account (e.g., feature-based authentication information for a given application in primary security policy 225) and a second set of features of one or more other instances of the applications based on a second authentication information for a secondary tenant customer account of the one or more secondary tenant customer accounts (e.g., e.g., feature-based authentication information for the given application in secondary security policy 235(3)). Therefore, given the conditional rendering, authentication manager 115 is able to perform a compare and adjust 240 operation to restrict access by MCSA 205 to one or more features of the first set of features based on the first authentication information and first set of varying access limits 210(1)-(N) and to one or more other features of the second set of features based on the second authentication information and Nth set of varying access limits 245(1)-(N).

As shown in FIG. 2A, authorization manager 110 is able to take advance of shared operations 250(1)-(N). As previously noted, in typical cloud-based cybersecurity product implementations, a suite of security-based software products are used to secure a computing and networking environment. For example, in the case of vulnerability risk management, which involves identifying security vulnerabilities in computing systems, devices, and endpoints, other security-based products are often necessary to realize the full scope of protection demanded by today's corporate customer. Therefore, in certain embodiments, MCSS 105 determines that an instance of a vulnerability management application (of the one or more instances of the one or more applications of the set of applications) has identified one or more security vulnerabilities. Because a vulnerability management application merely identifies, catalogues, and ranks vulnerabilities, another application or application instance is typically required to validate the identified vulnerabilities. In this example, MCSS 105 determines that another instance of a penetration testing application (of the one or more instances of the one or more applications of the set of applications) is required to validate those vulnerabilities identified by the vulnerability management application. Consequently, authorization manager 110 modifies a second varying access limit of the second set of varying access limits (e.g., varying access limit 245(5) of Nth set of varying access limits 245(1)-(N)) based on a time required to validate those security vulnerabilities by the another instance of the penetration testing application.

Therefore, MCSS 105 can configure and authorize a MCSA 205 based on varying access limits and/or durations that expire based on a client-level, an application level, and an application operation-level (e.g., application features, as discussed above). In addition to this initial three-tier-based configuration and authorization, MCSS 105 can also modify the access capabilities of MCSA 205 in realtime and on the fly (e.g., to match the average time it takes security engineers to perform a given task that involves more than one application or application instances) based on whether one or more application operations are shared and whether certain applications are complementary (e.g., application operations in each given application at issue is performed successively or as part of the same overall cybersecurity operation).

In certain embodiments, the security engineer is able to access instances (and other instances) of the applications in a single user interface (e.g., a Graphical User Interface (GUI)) using MCSA 205. As noted, the set of applications can include at least a vulnerability risk management (VRM) application, an incident detection and response (IDR) application, a dynamic application security testing (DAST) application, a penetration testing application, a security orchestration and automation (SOAR) application, an enterprise network traffic analysis (ENTA) application, and/or a cloud security posture management (CSPM) application. The set of applications can be communicatively coupled to each other and implemented on a cloud platform (e.g., the Insight Platform provided by Rapid7® of Boston, Mass.).

Example of Adjusting and/or Modifying a MCSA in Real-time

Figure 2B:
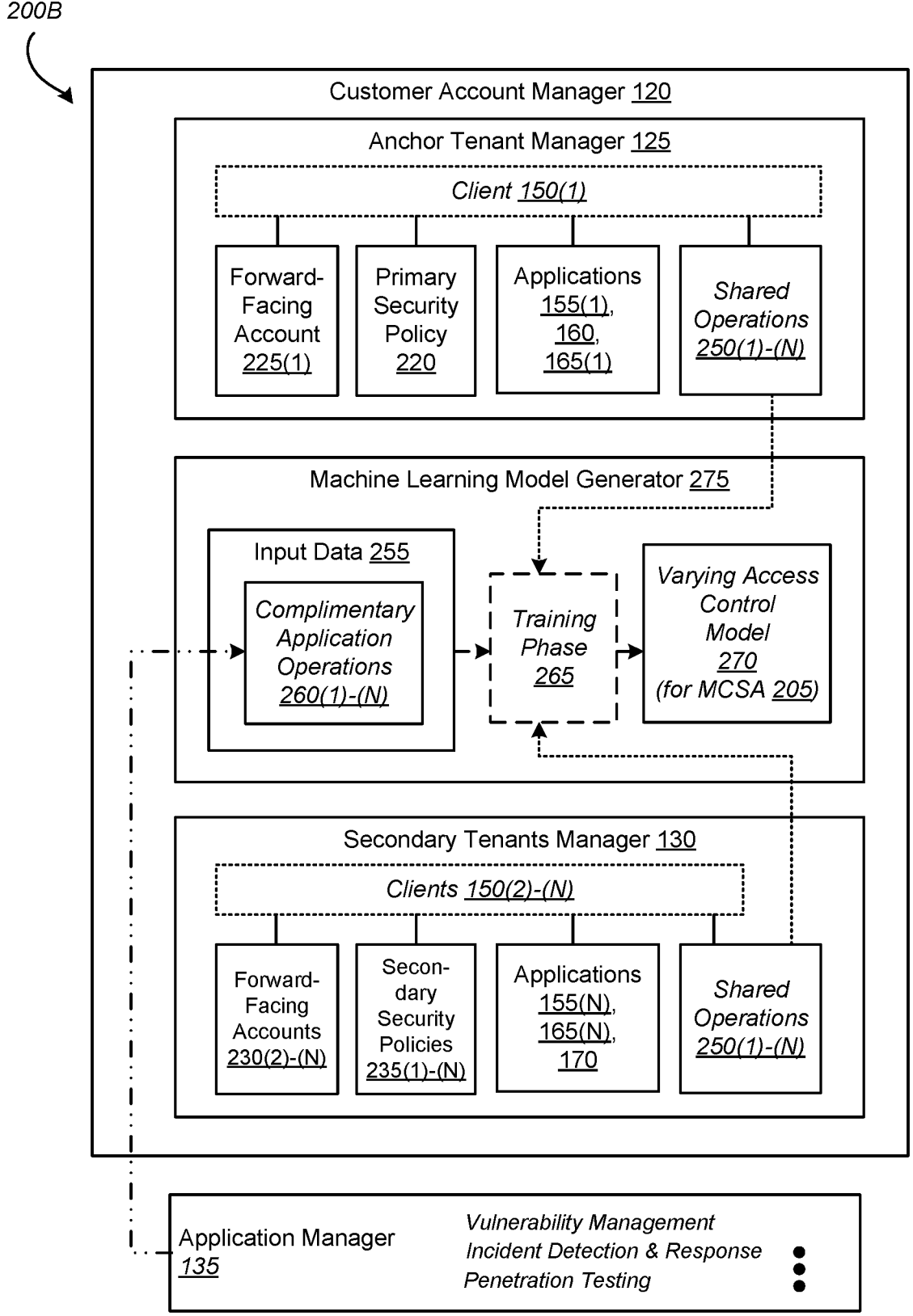
FIG. 2B is a block diagram 200B of a customer account manager, according to one embodiment of the present disclosure.

FIG. 2B is a block diagram 200B of a customer account manager, according to one embodiment. As previously noted, existing paradigms of multi-customer support access are not able to take advantage of realtime conditions in the computing and network environments in which such multi-customer support access is implemented. For example, in addition to configuring MCSA 205 with varying levels of access at various operational levels and application-based granularity, complementary applications, which are prevalent in cybersecurity computing environments are not treated appropriately. Moreover, machine learning is not employed in determining how much time a security engineer should reasonably require to "solve" a given "support ticket" at a particular moment in time in environments where application operations are shared and the applications themselves can be complementary to each other.

As shown in FIG. 2B, anchor tenant manager 125 includes client 150(1) with forward facing account 225(1), primary security policy 220 (e.g., a more restrictive security policy that secondary tenant customer accounts), applications 155(1), 160, and 165(1), and maintains the identity of shared operations 250(1)-(N). Similarly, secondary tenants manager 130 includes clients 150(2)-(N) (the remaining forward-facing customer accounts that are child accounts) with forward-facing accounts 230(2)-(N), secondary security policies 235(1)-(N), applications 155(N), 165(N), and 170, and maintains shared operations 250(1)-(N). Application manager 135 maintains one or more applications and/or application instances that are executing on clients 150(1)-(N) (e.g., VRM, IDR, penetration testing, and other cybersecurity applications).

In certain embodiments, customer account manager 120 implements a machine learning model generator 275 to generate a varying access control model 270 for MCSA 205 (e.g., to adjust and modify access durations, preferences, and rules on the fly and in realtime for MCSA 205). Machine learning model generator 275 receives or accesses input data 255 from various sources (e.g., various types of input data) to create and further train varying access control model 270. Examples of input data 255 include a list of complementary application operations 260(1) that identifies shared operations and complementary applications and their relationship. In one embodiment, complementary application operations 260(1) includes the following input data: client A executing a VRM application and a penetration testing application, where the VRM application and the penetration testing application are complementary to each other (as discussed above). In training phase 265, machine learning model generator 275 receives information identifying one or more shared operations (e.g., whether one or more operations to effectuate vulnerability assessment and vulnerability validation can be shared between the VRM application and the penetration testing application).

In other embodiments, input data 255 can include the following data points: (a) average time it took a security engineer at the same company to provide support to the same applications in the set of applications over the past week, months, years, and the like, (b) whether the varying time access limits have increased during a pre-determined previous period of time given an escalation of the support required and/or an increase in complexity of the issue being resolved, (c) indication whether a support engineer is performing too quickly and hence the allocated time prior to expiration is too large, and (d) how the support engineer is relatively performing.

For example, learnings from other support engineers as to the sequence of applications used can be used to increase or decrease one or more of the three-tier-level varying time limit positions of MCSA 205 for both the anchor tenant customer account and one or more secondary tenant customer accounts (e.g., an indication that operation A in a VRM application along with operation B in an IDR application, further combined with operation D in an ENTA application is the fastest method of solving a support issue that requires t3 for an anchor tenant customer account to be correspondingly reduced, and the like). Training varying control model 270 using such input data 255 permits MCSA 205 to be adjusted in realtime based on "live" computing and network conditions in support environments.

Example of Configuring and Authorizing a MCSA

Figure 3:
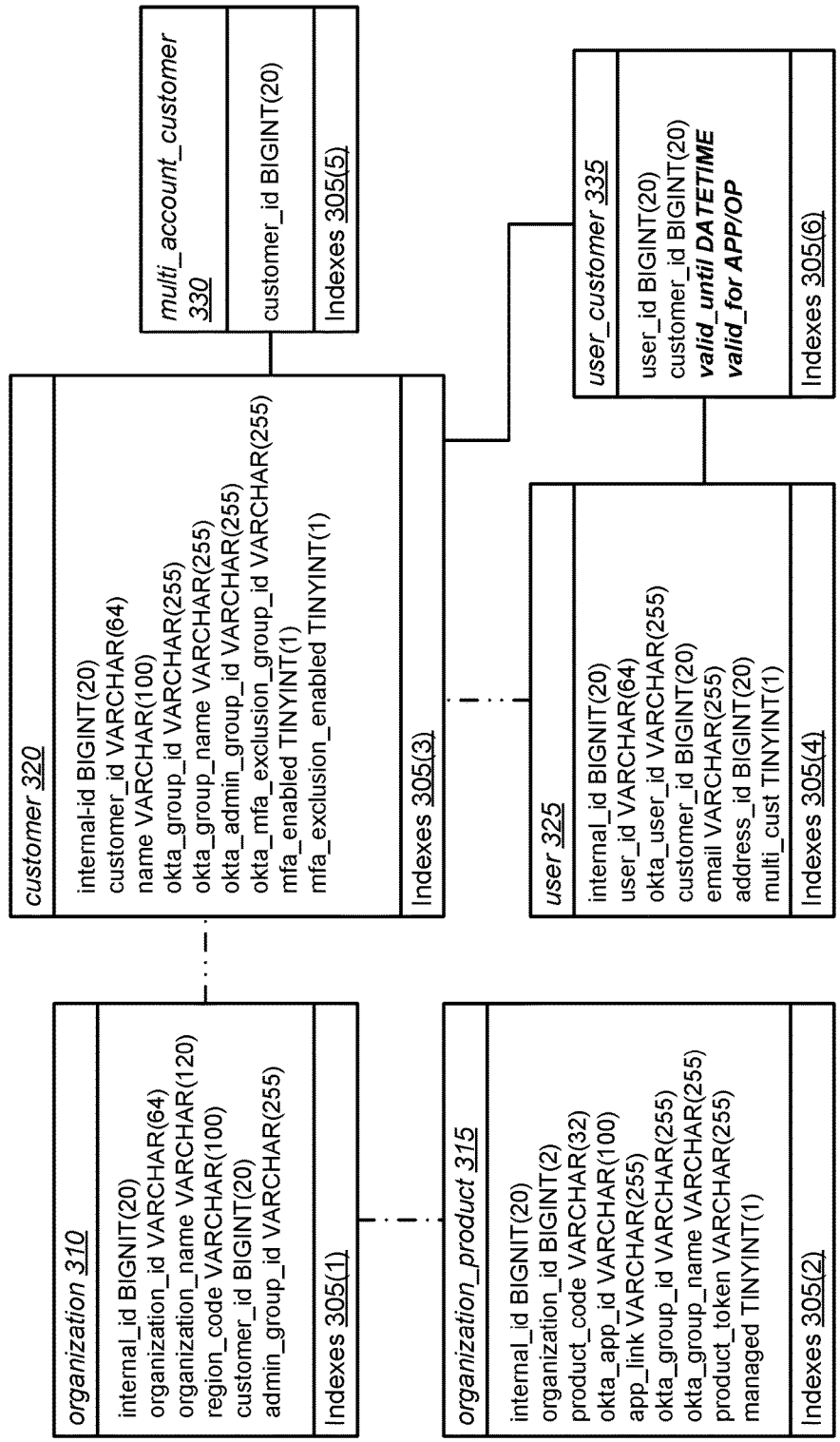
FIG. 3 is a block diagram 300 of example database schema to implement a multi-customer support account (MCSA), according to one embodiment of the present disclosure.

FIG. 3 is a block diagram 300 of example database schema to implement a multi-customer support account (MCSA), according to one embodiment. A database schema can be modified to store which (backward-facing) users (e.g., support engineers) have access to what customer (e.g., clients 150(1)-(N)) and how for long (at each operational juncture, as noted above). A 'multi_cust' field is added to a 'user' table to identify a multi-customer user. In addition, a 'user_customer' mapping table is added that includes a row for each customer a user has access to and holds the expiration time, 'valid_until' for access to that customer. Finally, a new 'multi_account_customer' table is added that has a 'customer_id' field, which contains an entry for each of the customer accounts that support multi-customer users. These customer accounts, as noted above, are called primary, parent, and/or anchor tenant customer accounts.

Also as noted, security is a critical consideration to safely enable multi-customer support access. In one embodiment, Active Directory (AD) provided by an identity provider (e.g., Okta) is used to determine who can access a multi-customer user interface (MCUI) of MCSS 105 and to control who can call multi-customer Application Programming Interfaces (APIs) due to permission checks implemented on the backend. For example, the MCUI can be configured to only display a multi-customer tab when a user has a correct AD group assigned to the given tab. By initially fetching users, roles, and features, certain features can be conditionally rendered based on access level. As an added security measure, permission checks can also be implemented on the APIs to prevent direct calling of those endpoints.

In some embodiments, if the correct AD group is assigned, a multi-customer user can be assigned to customer account(s). In this example, only MCSA 205 assigned to a primary customer (e.g., an anchor tenant) can be assigned to another customer (e.g., secondary tenants). MCSA 205 is then assigned products, roles, and the length of time MCSA 205 will have access to the given customer account (at each of the at least three operational levels). MCSS 105 maintains a history of multi-customer requests for each customer or client account.

In multi-customer support implementations, customers typically configure their own Multi-Factor Authorization (MFA) and password policies to ensure they secure their account(s) per their wishes. Consequently, different client devices have varying levels of security (e.g., more or less restrictive security policies as discussed with respect to FIG. 2A). Therefore, because a MCSA 205 is part of multiple customer groups by its very nature, such a multi-customer account can be subject to more than one MFA or password policy. In one embodiment, authentication manager 115, when configuring MFA for client 150(1), transmits an MFA exclusion list to client 150(1). In this example, the MFA exclusion list takes precedence over all other MFA policies by excluding multi-customer accounts and other accounts on the MFA exclusion list from one or more MFA policies. If MCSA 205 is included in the MFA exclusion list, MCSA 205 will match a 'mfa_disabled' policy because the MFA exclusion list takes precedence over other MFA policies applicable to MCSA 205.

In certain embodiments, event-driven computing processes implemented on a cloud-computing platform can be used to notify users (e.g., of MCSS 105) of multi-customer changes. Some examples include, (a) Ipims-multi-access-job (when a user is added to a customer, a multi-customer request is made to that customer and is triggered by the request being uploaded to object-storage associated with the cloud-computing platform; an event-driven process then notifies the user and platform administrators of any new or updated multi-customer access requests), (b) Ipims-multi-customer-access-closed-job (the platform administrator can grant or reject a multi-customer request using MCUI (user management) in MCSS 105; when this happens, the request is moved to a separate 'closed' path in object storage, where the foregoing upload to the 'closed' bucket in object storage triggers the event-based process, which then notifies the user that their request has been acted upon by the platform administrator), (c) Ipims-multi-customer-access-removed-job (when a multi-customer user's access has expired, an event-based process removes the user access and uploads to a 'multiCustomerRemoveRequests' object storage path; this upload to object storage triggers the foregoing event-based process which then notifies the platform administrator that a multi-customer user has been removed from their account).

As previously noted, one technical problem the methods, systems, and processes disclosed herein address is determining an optimal time period MCSA 205 is permitted to access a customer account and/or client device. In current implementations, when a user (e.g., support engineer) requests access to a customer, the user can self-assign a set of pre-defined roles. For example, a support engineer can be assigned as a platform administrator that provides full access to a customer's computing environment. If the customer is having technical issues with logs related to an IDR application, the foregoing level of access may be unnecessary and overkill to successfully and efficiently resolve the log-related issue. Instead, MCSS 105 implements an optimized approach for role based access where multi-customer support accounts are permitted to only request a level of access to certain features and/or resources.

For example, in some embodiments, a User Authorization Profile (UAP) is generated for each customer a support engineer (e.g., user) access to. The UAP includes resources, features, and products the support engineer has access to and what level of access they have within the given customer. The UAP is kept updated by regeneration each time the user access is changed (e.g., by sending a message to a Simple Queue Service (SQS) which is picked up the same service that is specifically designed to regenerate UAPs). Consequently, when the support engineer needs to diagnose an issue relating to a specific log in the IDR application, the support engineer can request a 'read' level access for that log file, giving the support engineer enough access to diagnose the issue at hand. The support engineer can be granted access to the client device (assuming the request is granted) and the support engineer's UAP is generated for that client device reflecting the level of access the support engineer has.

Therefore, in this manner, selective and granular access can be configured for MCSA 205 that can updated and modified in realtime using at least machine learning models. It will be appreciated that the methods, systems, and processes disclosed herein optimize access durations for sensitive client systems for support engineers to efficiently do their job and at the same time, only provide as much access as is necessary to complete the task at hand.

Example MCSA Authorization Table

FIG. 4 is a table 400 of a MCSA authorization table, according to one embodiment. MCSA authorization table 405 can be maintained by MCSS 105 (e.g., by authorization manager 110, authentication manager 115, or customer account manager 120). MCSA authorization table 405 is constantly updated based on varying access control model 270 that indicates whether access durations and other forms of access control for MCSA 205 should be updated or modified. For example, client 150(1) which has primary security policy 225 is configured with 10 minutes (total duration prior to expiry) for t1. In this example, the permitted applications are 155(1), 160, and 165(1), each with 4 minutes, 3 minutes, and 3 minutes, respectively (e.g., t2), whereas corresponding permitted operations 215(1)-(5), none, and 215(3)-(8), can be performed for permitted applications 155(1), 160, and 165(1) in 2 minutes, 0 minutes, and 1 minute, respectively (e.g., t3). Based on shared operations (e.g., 215(3), (4), and (5)), complementary applications (e.g., 155(1) and 165(1)), and one or more indications from varying access control model 270, MCSS 105 performs an adjustment to MCSA 205 based on an average time it takes to perform the foregoing shared operations for the foregoing complementary applications (which can potentially reduce or increase the pre-determined time durations of 2 minutes, 0 minutes, and 1 minute of t3 for permitted operations 215(1)-(5), none, and 215(3)-(8), respectively, and/or 4 minutes, 3 minutes, and 3 minutes of t2 for permitted applications for applications 155(1), 160, and 165(1), respectively, based on 'live' conditions).

Similarly, in another example, client 150(2) which has secondary security policy 235(1) is configured with 20 minutes (total duration prior to expiry) for t1. In this example, the permitted applications are 155(2), 165(1), and 170(1), each with 10 minutes, 4 minutes, and 6 minutes, respectively (e.g., t2), whereas corresponding permitted operations 215(1)-(2), 215(1), and 215(4)-(7), can be performed for permitted applications 155(2), 165(1), and 170 (1) in 5 minutes, 3 minutes, and 4 minute, respectively (e.g., t3). Based on shared operation (e.g., 215(1)) and complementary applications (e.g., 155(2) and 170(1)), and indications from varying access control model 270 (e.g., that shared operation 215(1) takes longer or shorter to complete for the given support problem), MCSS 105 performs an adjustment to MCSA 205 only at t3 (e.g., the third control point for controlling and adjusting MCSA 205 access—5 minutes, 3 minutes, and 4 minutes for permitted operations 215(1)-(2), 215(1), and 215(4)-(7), respectively).

Finally, in yet another example, client 150(3) which has secondary security policy 235(2) is configured with 24 hours (total duration prior to expiry) for t1. In this example, the permitted applications are 155(1), 160, and 170(1), each with 15 hours, 5 hours, and 4 hours, respectively (e.g., t2), whereas corresponding permitted operations 215(1)-(5), 215 (5)-(10), and 215(5)-(15), can be performed for permitted applications 155(1), 160, and 170(1) in 5 hours, 4 hours, and 14 hours, respectively (e.g., t3). Based on shared operations (e.g., 215(5) and 215 (5)-(10)) and complementary applications (e.g., 155(1), 160, and 170(1))), and one or more indications from varying access control model 270 (e.g., that both application operation duration and overall application access duration has to be modified to optimize the time that should be probabilistically required to successfully complete and solve a support ticket/problem), MCSS 105 performs an adjustment to MCSA 205 at both t2 and t3 (e.g., the second and third control points for controlling and adjusting MCSA 205 access).

Because the methods, systems, and processes disclosed and described herein permit selective access to applications and further granular access to application operations and functionality (each with its own time duration expiration that is adjusted based on a machine learning model), in some embodiments, macro authentication is used by authentication manager 115 to limit access by MCSA 205 to only certain parts of applications. When performing macro authentication, authentication manager 115 records a specific sequence of steps to successfully log in to an application. Recording authentication sequences permits a customer of client devices to define a series of steps in which a token needs to be captured for interacting with an application and can be replicated successfully during the course of an operation (e.g., a scan) in the event of a session loss. The operation can then resume after successfully replaying a recorded authentication sequence. To ensure that automating an authentication sequence provides consistent results, authentication manager 115 performs macro authentication only in the following scenarios: (a) if an application leverages single sign on (SSO) (e.g., applications leveraging SSO tend to redirect back and forth from a few different Uniform Resource Locators (URLs), (b) if an application has more than one step or field required to interact when logging in (e.g., a security question or one-time pages type prompts post authentication, a login form requiring more information than just a username and password, if the username and password are on separate pages, and the like), or (c) if an application has a heavy JavaScript presence on the front end (e.g., leveraging the likes of AngularJs, ReactJs, and the like).

Example Processes for Selective and Granular Multi-Customer Support Access

Figure 5A:
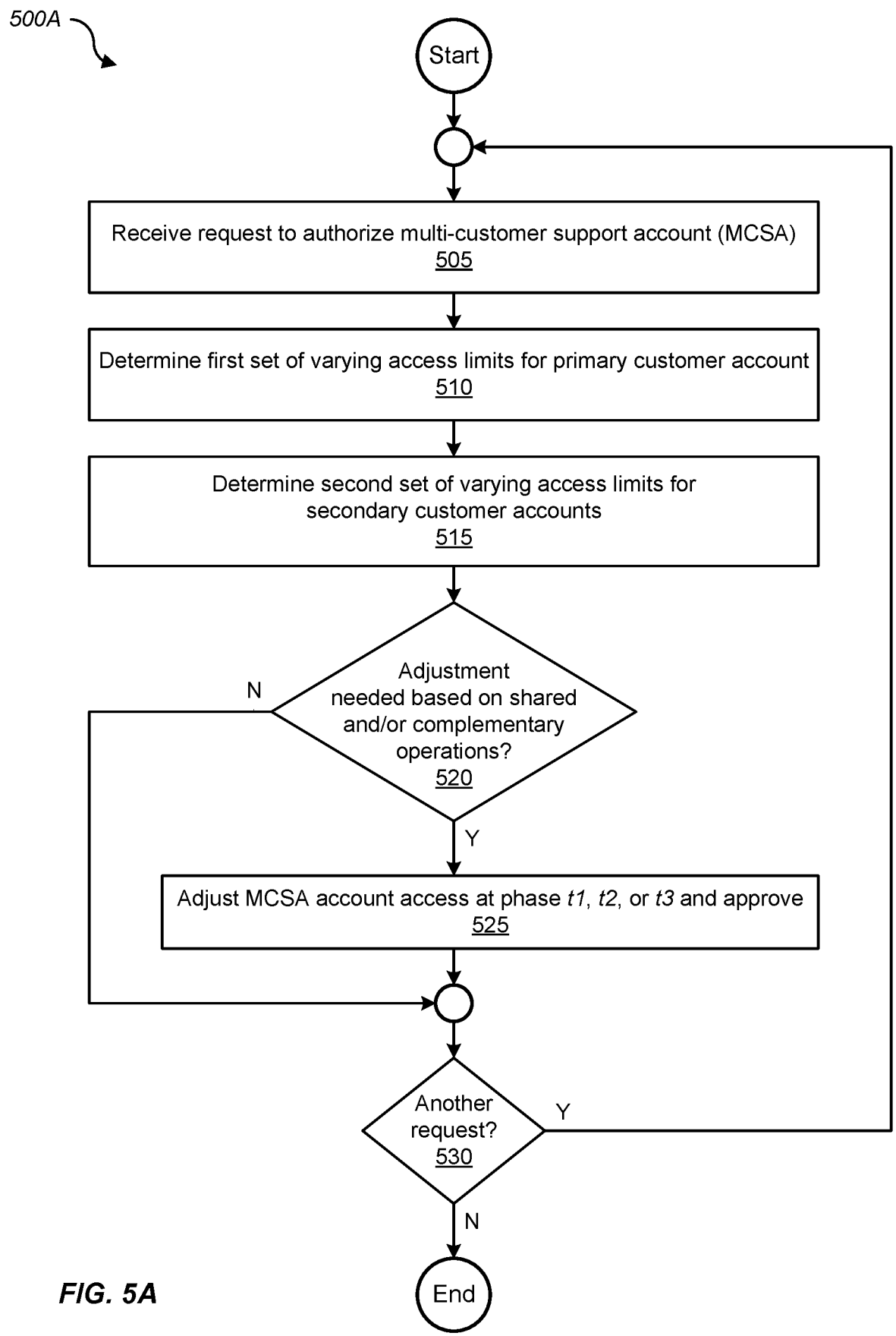
FIG. 5A is a flowchart 500A of a process to authorize a MCSA, according to one embodiment of the present disclosure.

FIG. 5A is a flowchart 500A of a process to authorize a MCSA, according to one embodiment. The process begins at 505 by receiving a request to authorize MCSA 205. Such a request can come from a user or support engineer, or can be part of a request queue that requires security level authentication 220 and eventual authorization. At 510, the process determines a first set of varying access limits for a primary customer account (e.g., the anchor tenant or parent customer account). The first set of varying access limits can include access time expiration durations for MCSA 205 at (at least) three stages or control points (which can be modified and updated in realtime): client-level, application-level, application feature/operation level (e.g., t1, t2, and t3 of first set of varying access limits 210(1)-(N) as shown in FIG. 2A).

At 515, the process determines a second set of varying access limits for secondary customer accounts (e.g., Nth set of varying access limits 245(1)-(N)) for multiple child customer accounts). Like the first set of varying access limits for the primary customer account, the second set of varying access limits can include access time expiration durations for MCSA 205 at (at least) three stages or control points (which can be modified and updated in realtime): client-level, application-level, application feature/operation level (e.g., t1, t2, and t3 of Nth set of varying access limits 240(1)-(N) as shown in FIG. 2A). At this stage, a parent-child relationship is established between the primary customer account and several secondary customer accounts (e.g., to determine shared operations, complementary applications, time required/taken by other support engineers whose primary account may be one of the secondary customer accounts, and the like). As noted, a secondary customer account can be a primary customer account for another MCSA (not MCSA 205—e.g., an MCSA used by another support engineer). Because varying access control model 270 is trained with input data 255, such input data can also include the average time it takes another support engineer to solve the same support problem. Further, because training phase 265 intakes shared operations 250 (1)-(N), this secondary support engineer time-based data can be incorporated into training varying access control model 270 to determine whether the expiration time durations of MCSA 205 must be adjusted upward or downward (or maintained at the same level). In this manner, varying access control model 270 continually ensures that a support engineer only has access to a client device, one or more applications, and one or more application features only for as long as is required based on extraneous 'live' factors.

At 520, and as noted above, the process determines whether adjustments are needed based on shared operations and/or complementary applications. If adjustments or modifications are needed, the process, at 525, adjusts the primary MCSA (e.g., MCSA 205) account access at phase t1, t2, and/or t3 (and approves the request to authorize MCSA 205). If adjustments are not needed, or after needed adjustments are made, the process, at 530, determines if there is another request. If there is another request, the process loops to 505. Otherwise, the process ends.

Figure 5B:
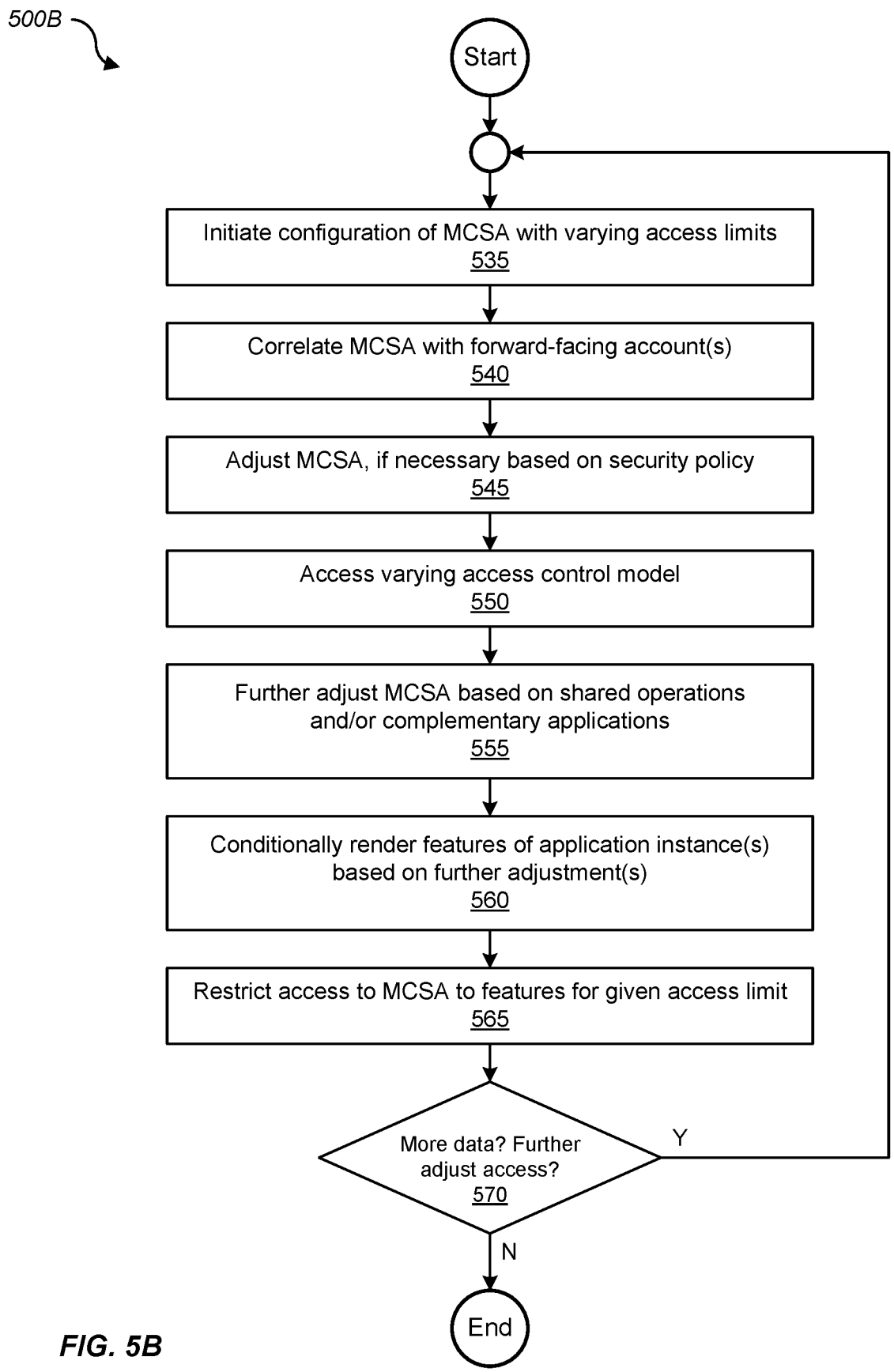
FIG. 5B is a flowchart 500B of a process to restrict access to a MCSA, according to one embodiment of the present disclosure.

FIG. 5B is a flowchart 500B of a process to restrict access to a MCSA, according to one embodiment. The process begins at 535 by initiating configuration of MCSA 205 with varying access limits, and at 540, correlates MCSA 205 with a forward-facing account. At 545, the process adjusts MCSA 205, if necessary, based on a security policy (e.g., primary security policy 225—with customer time and access requirements, and the like). At 550, the process accesses varying access control model 270, and at 555, further adjusts (or modifies) the access time expiration durations for MCSA 205 (at phase t1, t2, and/or t3) based on shared operations, complementary applications, or 'extraneous' input data that is used to train varying access control model 270 (e.g., secondary support engineer behavioral data such as time taken/needed with/for the same client, application(s), application operation(s) that can indicate what the optimal time should be, based on current computing and networking conditions at the client site or on the client device). At 560, the process conditionally renders features of application instances based on further adjustments, and at 565, restricts access to MCSA 205 to features for a given access limit (e.g., at t3). For example, the process can determine that the technical issue requires validating vulnerabilities discovered by a VRM application using a penetration testing application and that the same issue (e.g., the same vulnerabilities) was solved in 5 minutes by several support engineers over the past month (with other customers) (e.g., because of using a SOAR tool that orchestrates and automates operations). The process can then determine that the penetration testing application and VRM application are complementary applications and that the vulnerability validation operation and penetration testing operation are a 'shared' operation. If t3 of the current MCSA 205 is 10 minutes, the process use varying access control model 270 to determine that MCSA 205 should be downward adjusted by 5 minutes to increase customer security (e.g., by not giving a support engineer an extra 5 minutes when the extra time is not needed). At 570, the process determines if there is more data or further adjustments are needed. If there is more (input) data or more adjustments are needed, the process loops to 535. Otherwise, the process ends.

Example Computing and Networking Environment

Figure 6:
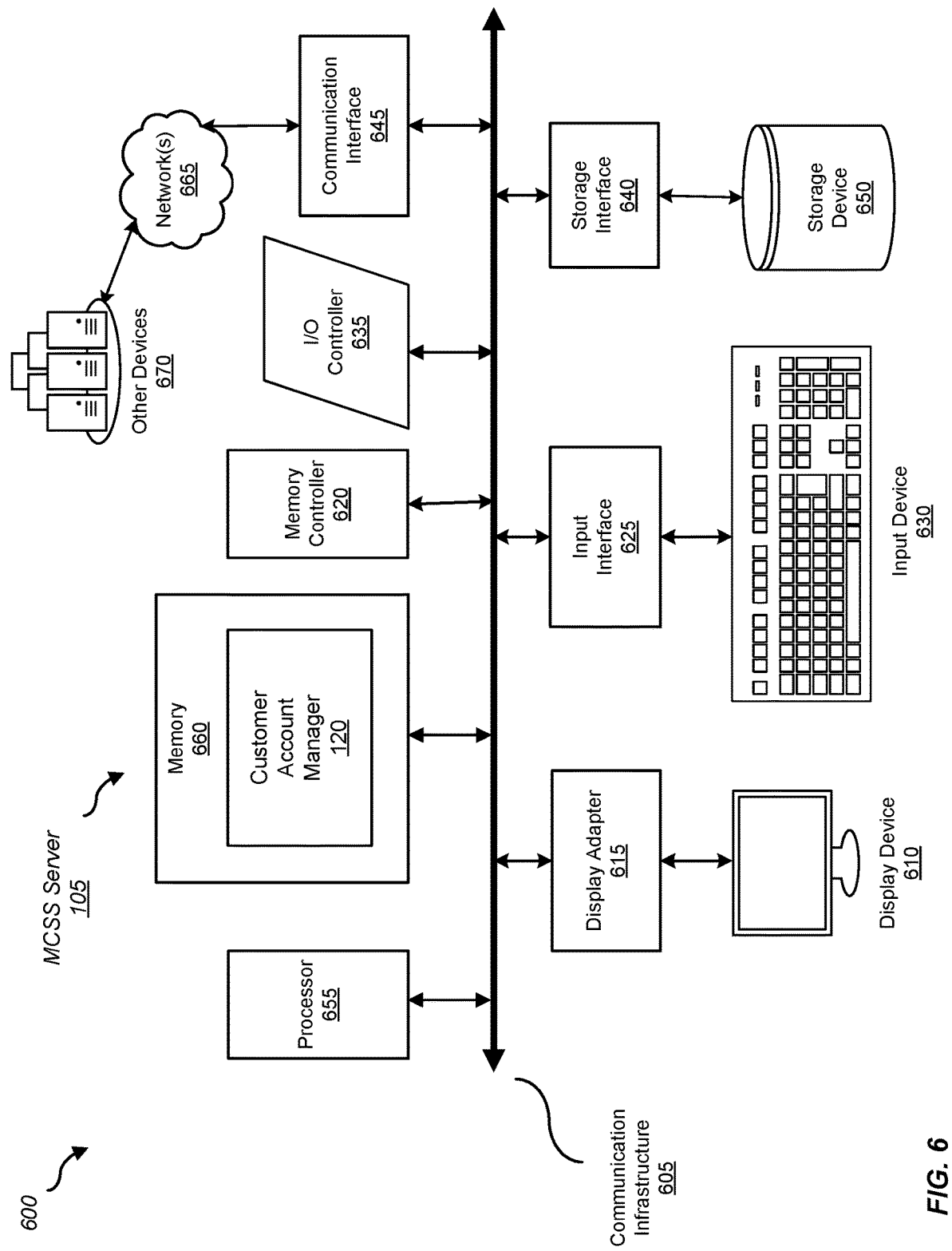
FIG. 6 is a block diagram 600 of a computing and networking system system, illustrating how a customer account manager can be implemented in software, according to one embodiment of the present disclosure.

FIG. 6 is a block diagram 600 of a computing and networked system, illustrating how customer account manager 120, authorization manager 110, and/or authentication manager 115 can be implemented in software, according to one embodiment. Computing system 600 can include MCSS 105 and broadly represents any single or multi-processor computing device or system capable of executing computer-readable instructions. Examples of computing system 600 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 600 may include at least one processor 655 and a memory 660. By executing the software that executes customer account manager 120, authorization manager 110, and/or authentication manager 115, computing system 600 becomes a special purpose computing device that is configured to provide selective and granular multi-customer support access in a secure and time-controlled manner.

Processor 655 generally represents any type or form of processing unit capable of processing data or interpreting and executing instructions. In certain embodiments, processor 655 may receive instructions from a software application or module. These instructions may cause processor 655 to perform the functions of one or more of the embodiments described and/or illustrated herein. For example, processor 655 may perform and/or be a means for performing all or some of the operations described herein. Processor 655 may also perform and/or be a means for performing any other operations, methods, or processes described and/or illustrated herein.

Memory 660 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 600 may include both a volatile memory unit and a non-volatile storage device. In one example, program instructions implementing customer account manager 120, authorization manager 110, and/or authentication manager 115 may be loaded into memory 660.

In certain embodiments, computing system 600 may also include one or more components or elements in addition to processor 655 and/or memory 660. For example, as illustrated in FIG. 6, computing system 600 may include a memory controller 620, an Input/Output (I/O) controller 635, and a communication interface 645, each of which may be interconnected via a communication infrastructure 605. Communication infrastructure 605 generally represents any type or form of infrastructure capable of facilitating communication between one or more components of a computing device. Examples of communication infrastructure 605 include, without limitation, a communication bus (such as an Industry Standard Architecture (ISA), Peripheral Component Interconnect (PCI), PCI express (PCIe), or similar bus) and a network.

Memory controller 620 generally represents any type/form of device capable of handling memory or data or controlling communication between one or more components of computing system 600. In certain embodiments memory controller 620 may control communication between processor 655, memory 660, and I/O controller 635 via communication infrastructure 605. In certain embodiments, memory controller 620 may perform and/or be a means for performing, either alone or in combination with other elements, one or more of the operations or features described and/or illustrated herein. I/O controller 635 generally represents any type or form of module capable of coordinating and/or controlling the input and output functions of a computing device. For example, in certain embodiments I/O controller 635 may control or facilitate transfer of data between one or more elements of computing system 600, such as processor 655, memory 660, communication interface 645, display adapter 615, input interface 625, and storage interface 640.

Communication interface 645 broadly represents any type/form of communication device/adapter capable of facilitating communication between computing system 600 and other devices and may facilitate communication between computing system 600 and a private or public network. Examples of communication interface 645 include, a wired network interface (e.g., network interface card), a wireless network interface (e.g., a wireless network interface card), a modem, and any other suitable interface. Communication interface 645 may provide a direct connection to a remote server via a direct link to a network, such as the Internet, and may also indirectly provide such a connection through, for example, a local area network. Communication interface 645 may also represent a host adapter configured to facilitate communication between computing system 600 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 600 may also include at least one display device 610 coupled to communication infrastructure 605 via a display adapter 615 that generally represents any type or form of device capable of visually displaying information forwarded by display adapter 615. Display adapter 615 generally represents any type or form of device configured to forward graphics, text, and other data from communication infrastructure 605 (or from a frame buffer, as known in the art) for display on display device 610. Computing system 600 may also include at least one input device 630 coupled to communication infrastructure 605 via an input interface 625. Input device 630 generally represents any type or form of input device capable of providing input, either computer or human generated, to computing system 600. Examples of input device 630 include a keyboard, a pointing device, a speech recognition device, or any other input device.

Computing system 600 may also include storage device 650 coupled to communication infrastructure 605 via a storage interface 640. Storage device 650 generally represents any type or form of storage devices or mediums capable of storing data and/or other computer-readable instructions. For example, storage device 650 may include a magnetic disk drive (e.g., a so-called hard drive), a floppy disk drive, a magnetic tape drive, an optical disk drive, a flash drive, or the like. Storage interface 640 generally represents any type or form of interface or device for transmitting data between storage device 650, and other components of computing system 600. Storage device 650 may be configured to read from and/or write to a removable storage unit configured to store computer software, data, or other computer-readable information. Examples of suitable removable storage units include a floppy disk, a magnetic tape, an optical disk, a flash memory device, or the like. Storage device 650 may also include other similar structures or devices for allowing computer software, data, or other computer-readable instructions to be loaded into computing system 600. For example, storage device 650 may be configured to read and write software, data, or other computer-readable information. Storage device 650 may also be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from that shown in FIG. 6. Computing system 600 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 600 for storage in memory via a network such as the Internet or upon a carrier medium.

The computer-readable medium containing the computer program may be loaded into computing system 600. All or a portion of the computer program stored on the computer-readable medium may then be stored in memory 660, and/or various portions of storage device 650. When executed by processor 655, a computer program loaded into computing system 600 may cause processor 655 to perform and/or be a means for performing the functions of one or more of the embodiments described/illustrated herein. Alternatively, one or more of the embodiments described and/or illustrated herein may be implemented in firmware and/or hardware.

Networks 665 or 145 generally represents any type or form of computer network or architecture capable of facilitating communication between MCSS 105 and clients 150(1)-(N). For example, networks 665 or 145 can be a Wide Area Network (WAN) (e.g., the Internet) or a Local Area Network (LAN). In certain embodiments, a communication interface, such as communication interface 645 in FIG. 6, may be used to provide connectivity between MCSS 105 and clients 150(1)-(N), and networks 145 or 665. The embodiments described and/or illustrated herein are not limited to the Internet or any particular network-based environment.

In some embodiments, customer account manager 120, authorization manager 110, and/or authentication manager 115 may be part of MCSS 105, or may be separate. If separate, customer account manager 120, authorization manager 110, and/or authentication manager 115 may be communicatively coupled via networks 145 or 665. In one embodiment, all or a portion of one or more of embodiments may be encoded as a computer program and loaded onto and executed by MCSS 105 and may be stored on MCSS 105, and distributed over networks 145 or 665.

In some examples, all or a portion of customer account manager 120, authorization manager 110, application manager 135, and/or authentication manager 115 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, customer account manager 120, authorization manager 110, and/or authentication manager 115 may transform the behavior of MCSS 105 to facilitate, configure, provision, authorize, authenticate, and/ or provide selective and granular multi-customer support access in cybersecurity computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
configuring, at a multi-customer support server (MCSS), a multi-customer support account (MCSA) that is authorized to selectively manage a plurality of applications executing on a client device;
accessing a MCSA authorization table maintained by the MCSS;
determining, from the MCSA authorization table,
a first access duration based on a security policy associated with the client device,
a second access duration for each of a plurality of permitted applications of the plurality of applications executing on the client device, and
a third access duration for each of the plurality permitted applications based on a plurality permitted operations for each of the plurality permitted applications;
determining that one or more permitted operations between two or more of the plurality permitted applications of the plurality of permitted operations are complementary;
adjusting the second access duration or the third access duration in the MCSA for the client device based on a machine learned varying access control model (VACM) by limiting durational access required to perform the one or more permitted operations; and
updating the MCSA authorization table maintained by the MCSS.

2. A non-transitory computer readable storage medium comprising program instructions executable to:
receive, at a multi-customer support server (MCSS), a request to modify configuration of a multi-customer support account (MCSA) that is authorized to manage a plurality of applications executing on a client device;
access a MCSA authorization table maintained by the MCSS;
determine, from the MCSA authorization table,
a first access duration based on a security policy associated with the client device,
a second access duration for each of a plurality of permitted applications of the plurality of applications executing on the client device, and
a third access duration for each of the plurality permitted applications based on a plurality permitted operations for each of the plurality permitted applications;
determine that one or more permitted operations between two or more of the plurality permitted applications of the plurality of permitted operations are complementary;
adjust the second access duration or the third access duration in the MCSA for the client device based on a machine learned varying access control model (VACM) by limiting durational access required to perform the one or more permitted operations; and
update the MCSA authorization table maintained by the MCSS.

3. A system comprising:
one or more processors; and
a memory coupled to the one or more processors, wherein the memory stores program instructions executable by the one or more processors to:
receive, at a multi-customer support server (MCSS), a request to modify configuration of a multi-customer support account (MCSA) that is authorized to manage a plurality of applications executing on a client device;
access a MCSA authorization table maintained by the MCSS;
determine, from the MCSA authorization table,
a first access duration based on a security policy associated with the client device,
a second access duration for each of a plurality of permitted applications of the plurality of applications executing on the client device, and
a third access duration for each of the plurality permitted applications based on a plurality permitted operations for each of the plurality permitted applications;
determine that one or more permitted operations between two or more of the plurality permitted applications of the plurality of permitted operations are complementary;
adjust the second access duration or the third access duration in the MCSA for the client device based on a machine learned varying access control model (VACM) by limiting durational access required to perform the one or more permitted operations; and
update the MCSA authorization table maintained by the MCSS.

* * * * *